US009093865B2

(12) United States Patent
Klein et al.

(10) Patent No.: US 9,093,865 B2
(45) Date of Patent: Jul. 28, 2015

(54) ELECTRIC ENERGY CONVERSION SYSTEM

(75) Inventors: Francois Klein, Valence Cedex (FR);
Christophe Taurand, Valence Cedex (FR)

(73) Assignee: Thales, Neuilly sur Serine (FR)

(*) Notice: Subject to any disclaimer, the term of this patent is extended or adjusted under 35 U.S.C. 154(b) by 822 days.

(21) Appl. No.: 13/207,386

(22) Filed: Aug. 10, 2011

(65) Prior Publication Data
US 2012/0062045 A1  Mar. 15, 2012

(30) Foreign Application Priority Data

Aug. 10, 2010 (FR) .................................... 10 03327

(51) Int. Cl.
*H02J 1/06* (2006.01)
*H02J 7/34* (2006.01)
*H02M 1/00* (2007.01)

(52) U.S. Cl.
CPC .......... *H02J 7/345* (2013.01); *H02M 2001/008* (2013.01)

(58) Field of Classification Search
CPC ........ H02J 1/06; H02M 2001/008; G05F 3/06
USPC ........................................................ 307/151
See application file for complete search history.

(56) References Cited

U.S. PATENT DOCUMENTS

| 3,134,053 | A | * | 5/1964 | Wittig et al. | ............... | 361/175 |
| 3,986,098 | A | * | 10/1976 | Tamii et al. | ............... | 363/135 |
| 6,091,611 | A | * | 7/2000 | Lanni | ............... | 363/79 |
| 2004/0164618 | A1 | * | 8/2004 | Bryde | ............... | 307/64 |
| 2005/0162137 | A1 | * | 7/2005 | Tracy et al. | ............... | 323/217 |
| 2006/0132102 | A1 | * | 6/2006 | Harvey | ............... | 320/166 |
| 2006/0139819 | A1 | | 6/2006 | May | | |
| 2007/0219749 | A1 | * | 9/2007 | Jayabalan et al. | ............ | 702/182 |

(Continued)

FOREIGN PATENT DOCUMENTS

FR          2 895 167           6/2007

OTHER PUBLICATIONS

Cacciato, M. et al., "A Critical Evaluation and Design of Bi-Directional DC/DC Converters for Super-Capacitors Interfacing in Fuel Cell Applications." IEEE Industry Applications Conference. Oct. 3, 2004, vol. 2, pp. 1127-1133, Piscataway, NJ, USA.

(Continued)

*Primary Examiner* — Jared Fureman
*Assistant Examiner* — Joel Barnett
(74) *Attorney, Agent, or Firm* — Knobbe Martens Olson & Bear LLP

(57) ABSTRACT

This electric energy conversion system of the type including a main converter (40) connected at the input to at least one input network (41) operating under an input voltage and at the output to an output network (42) operating under an output voltage and associated with an electric energy storage device, operating under a storage voltage, including a bidirectional charger (46) connected to the output network (42) on the one hand and to capacitive electric energy storage means (48) on the other hand, the operation of the bidirectional charger (46) being driven by control means (49) for slaving the output voltage on a first set value ($V_{ref2}$), is characterized in that the operation of the main converter (40) is driven by control means (50) for slaving the storage voltage on a second set value ($V_{ref1}$).

10 Claims, 10 Drawing Sheets

(56) References Cited

U.S. PATENT DOCUMENTS

Figure 1:
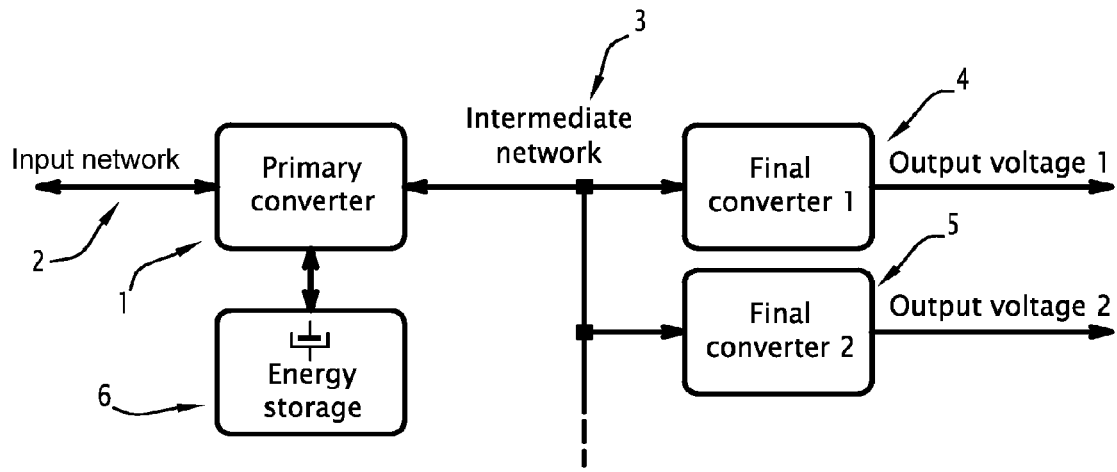

2008/0239766 A1* 10/2008 Trattler .................. 363/21.05
2009/0260668 A1    10/2009 Maeda
2010/0165667 A1*  7/2010 Artusi et al. ............. 363/21.01

OTHER PUBLICATIONS

Ke, Jin et al., "Hybrid Full-Bridge Three-Level LLC Resonant Converter—A Novel DC/DC Converter Suitable for Fuel Cell Power System." IEEE, Power Electronics Specialists Conference. Jan. 1, 2005, pp. 361-367, Piscataway, NJ, USA.

French Search Report for French Patent Application No. 10 03327, received Mar. 31, 2011.

French Written Opinion for French Patent Application No. 10 03327. Jan. 2006.

* cited by examiner

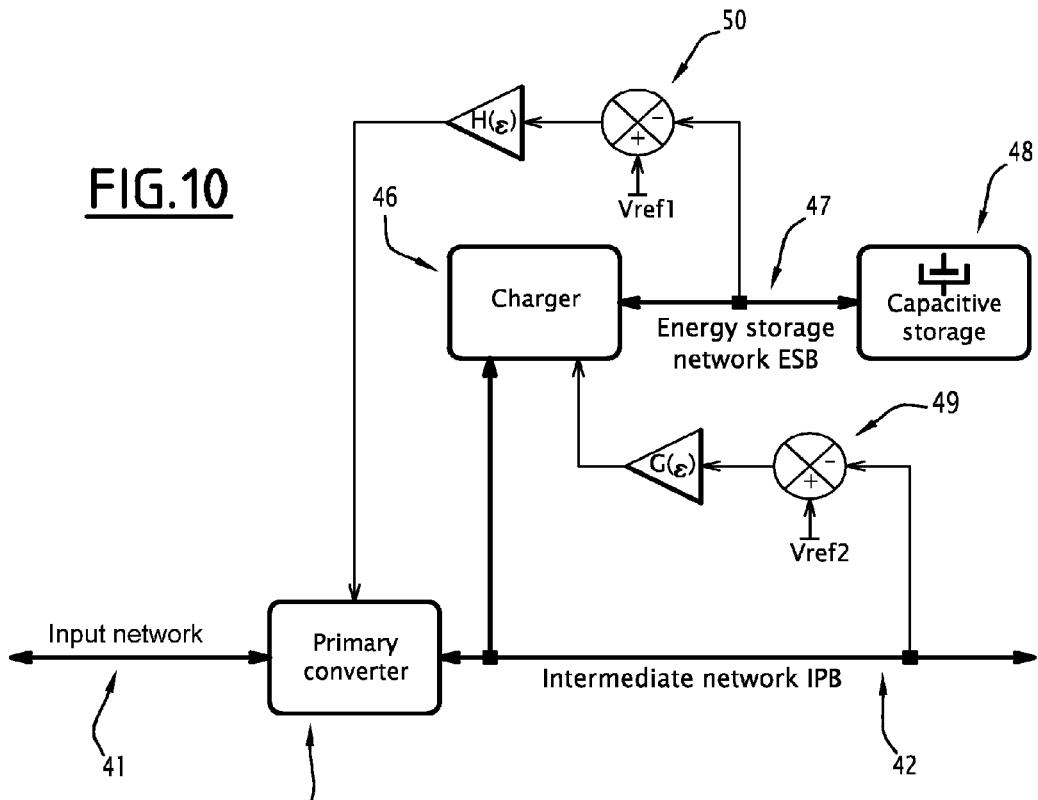
FIG.10
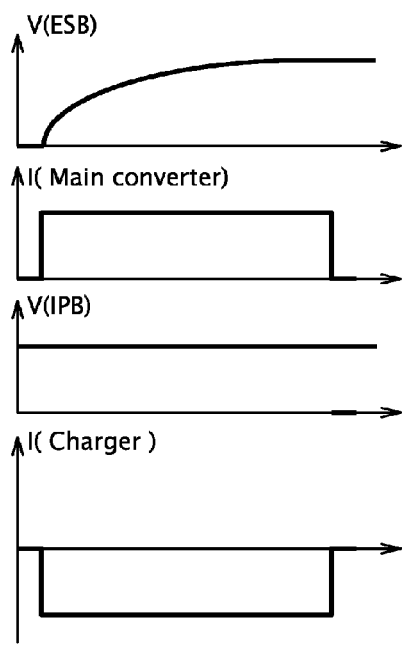
FIG.11
FIG.12
FIG.13
FIG.14

ELECTRIC ENERGY CONVERSION SYSTEM

The present invention relates to an electric energy conversion system.

An example of such a system may be found in document US 2009/0260668 which describes a system according to the preamble of claim 1.

More particularly, the system according to the invention may find applications within the scope of energy conversion from an AC or DC primary power network to a DC output or intermediate network. Systems of this type are for example known as network conditioners.

This type of conversion systems finds applications for example in onboard power supply networks, notably on board aircraft.

Of course, other applications may be contemplated.

In this type of application, it is sought to obtain a certain number of particular characteristics.

Actually, such systems should have certain transparence to transient power line disturbances of the primary power network. In this case, the energy allowing this characteristic is stored in a capacitive device for storing energy, for example of the aluminium electrochemical capacitor type.

Of course, for this function, other types of energy storage devices such as for example batteries may also be used.

Another sought characteristic is low pass filtering, i.e. averaging, of a current request generated by the final loads, for example by means of the same capacitive device for storing energy.

This filtering then prevents pollution of the primary power network by current requests with a too high frequency.

Such a characteristic is particularly important in avionic networks notably because of new applicable electric standards.

Different solutions providing a solution to these problems have already been proposed in the state of the art.

Thus, for example, in the state of the art, the use of a capacitive device for storing energy directly placed on the intermediate network has already been proposed.

The voltage of the intermediate network is then controlled by a primary converter. The current requests of the final converters i.e. those connected at the output of the latter are filtered by means of the current/voltage characteristic of the energy storage device i.e. by the impedance of the capacitors.

In order to benefit from the maximum energy stored in the energy reserve, the final converters work on an extended voltage range, for example between the rated voltage of the intermediate network and half of this voltage.

Thus, during a transient power line disturbance, the primary converter no longer provides any power. The energy is then delivered by the capacitive energy storage device.

The voltage of the intermediate network naturally decreases according to the requested current by the final converters, as a function of time and depending on the capacitance.

However, such a structure has a certain number of drawbacks.

Indeed, it is not possible to use the capacitive device for storing energy at its maximum energy density. The optimum voltage of use for aluminium electrolytic capacitors is about 100 volts. The use of this voltage as a rated voltage of the intermediate network then causes overdimensioning of the final converters, non-optimum yields on the latter as well as insulation constraints.

Moreover, and in order to obtain good energy density on the capacitive energy storage device, the voltage of the intermediate network should not be too low. Typically, a voltage close to 35 volts is selected. Such a voltage is a drawback for the final low voltage converters in terms of yield.

Finally, in order to be able to recharge the reserve of energy while providing the useful power at the end of a power line disturbance, the primary converter should have a constant power output characteristic over the whole range of output voltages. The accumulation topology also known in the state of the art as "flyback" is then the only one possible if the intention is to avoid overdimensioning of this converter.

The use of energy reserves on an intermediate network and an extension converter has also been proposed in the state of the art.

Such a structure is for example described in document FR 2 895 167 in the name of the applicant.

Thus, and in order to solve the first problem mentioned earlier, i.e. the impossibility of using the energy storage device at its optimum energy density, a bi-directional converter also called a charger is added, with which it is possible to make the link between the intermediate network and an energy storage network.

The charger then controls the voltage of the energy storage network so that it is proportional to that of the intermediate network. It is thus possible to use aluminium electrolytic capacitors at 100 volts on the energy storage network without any impact on the remainder of the design.

However, this solution is not optimum since it adds a converter to an already complex assembly and leaves untouched the issue of the input dynamic range of the final converters.

Another solution consists of placing the energy reserve on an intermediate stage and of controlling the network by means of an additional bidirectional converter called a regulator.

In the state of the art, this architecture is very often used for power supplies with a power factor corrector also known under the name of PFC with two stages, i.e. a boost stage and an insulating stage.

The voltage of the intermediate network is a constant DC voltage in all the operating phases, insofar that it is controlled by the regulator. The constraint of a wide input dynamic range is transferred to the regulator and the final converters operate with constant input voltage.

The main drawback of this architecture is the fact that the power transfer between the primary network and the different output voltages under steady state conditions is accomplished through the regulator. This has a strong impact on the yield of the total energy conversion chain since there are then three converter stages.

The goal of the invention is therefore to solve these problems.

For this purpose, the object of the invention is an electric energy conversion system of the type including a main converter connected at the input to at least one input network operating under an input voltage and at the output to an output network operating under an output voltage and associated with a device for storing electric energy, operating under a storage voltage, including a bidirectional charger connected to the output network on the one hand and to capacitive means for storing electric energy on the other hand, the operation of the bi-directional charger being driven by control means for slaving the output voltage on a first set value, characterized in that the operation of the main converter is driven by control means for slaving the storage voltage on a second set value.

According to other aspects of the invention, the electric energy conversion system comprises one or more of the following features:

the bidirectional charger includes a synchronous rectifier controlled in a peak current mode and with limitation of positive and negative current and operating at a set frequency, the means for controlling the operation of the main converter include a proportional regulator, the slaving rate of the means for controlling the bidirectional charger is greater than that of the means for controlling the main converter, it includes means for galvanic insulation between the primary network and the intermediate network, the galvanic insulation means are integrated into the main converter, the galvanic insulation means are integrated in a network conditioner integrated into the output network, the output network includes two portions separated by means forming a switch and to which are connected distinct loads, the input network is a DC network, and the input network is an AC network.

Figure 2:
Figure 3:
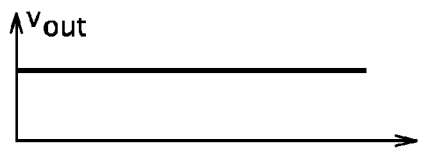
Figure 4:
Figure 5:
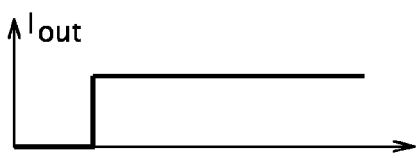
Figure 6:
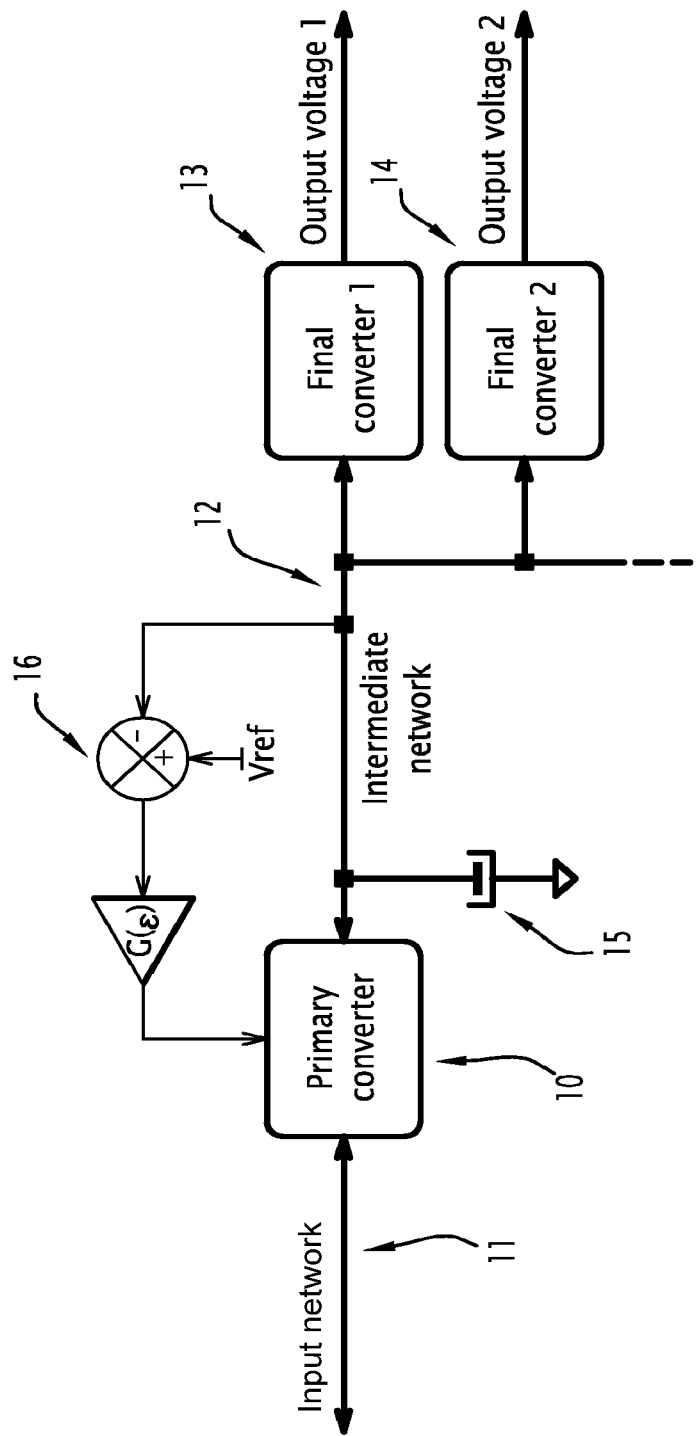
Figure 7:
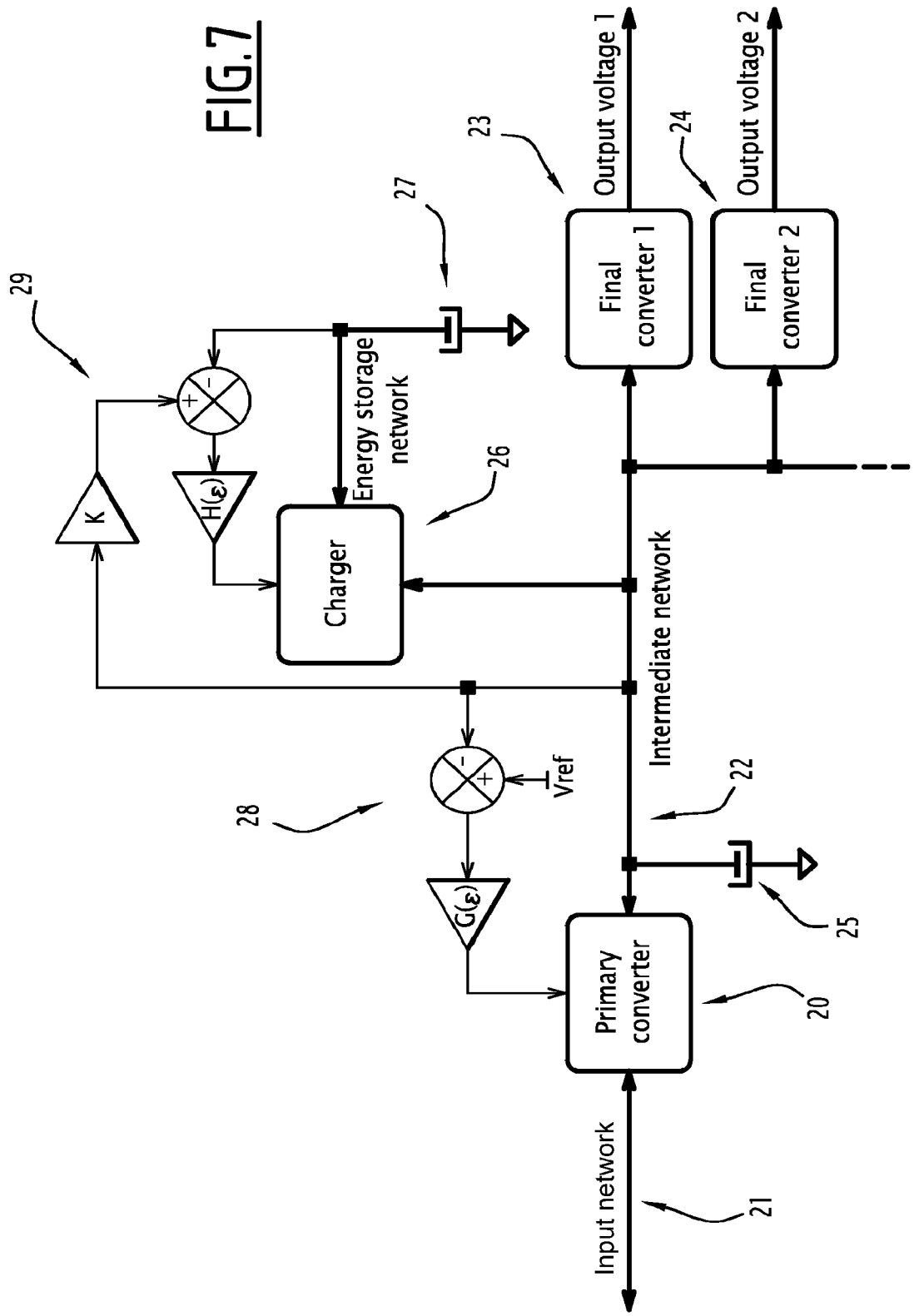
Figure 8:
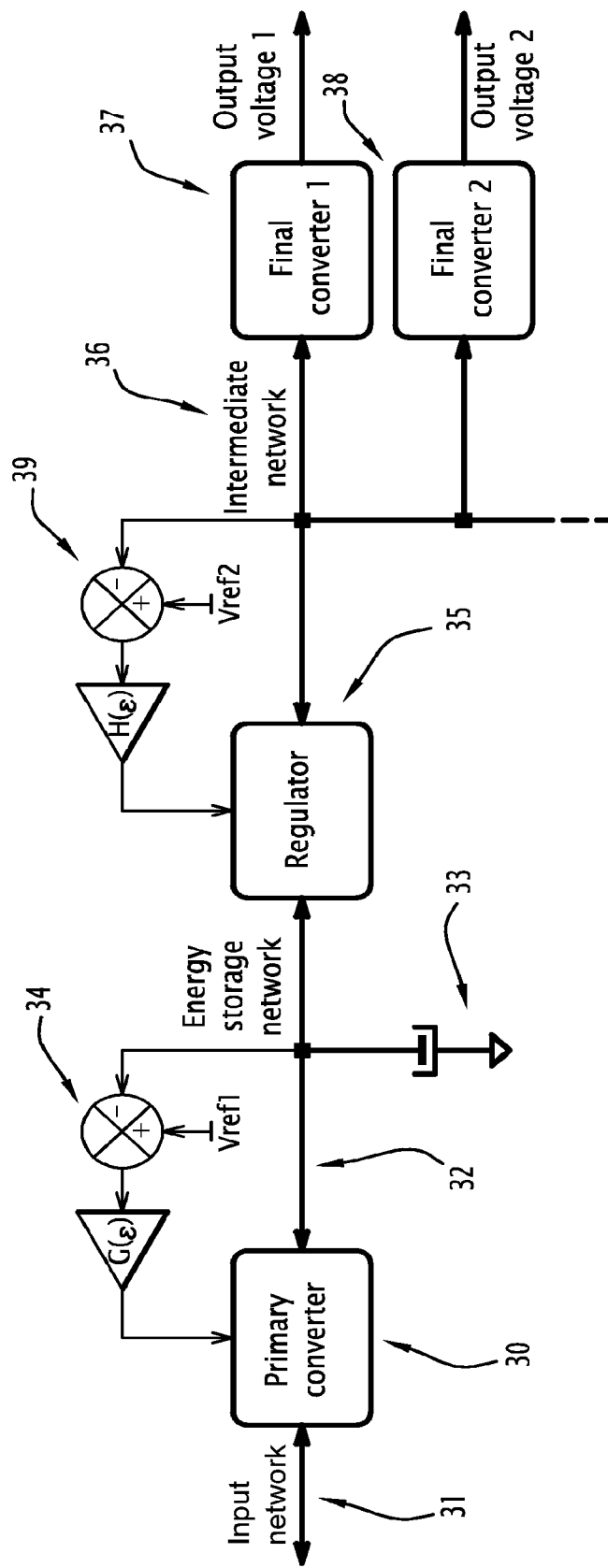
Figure 9:
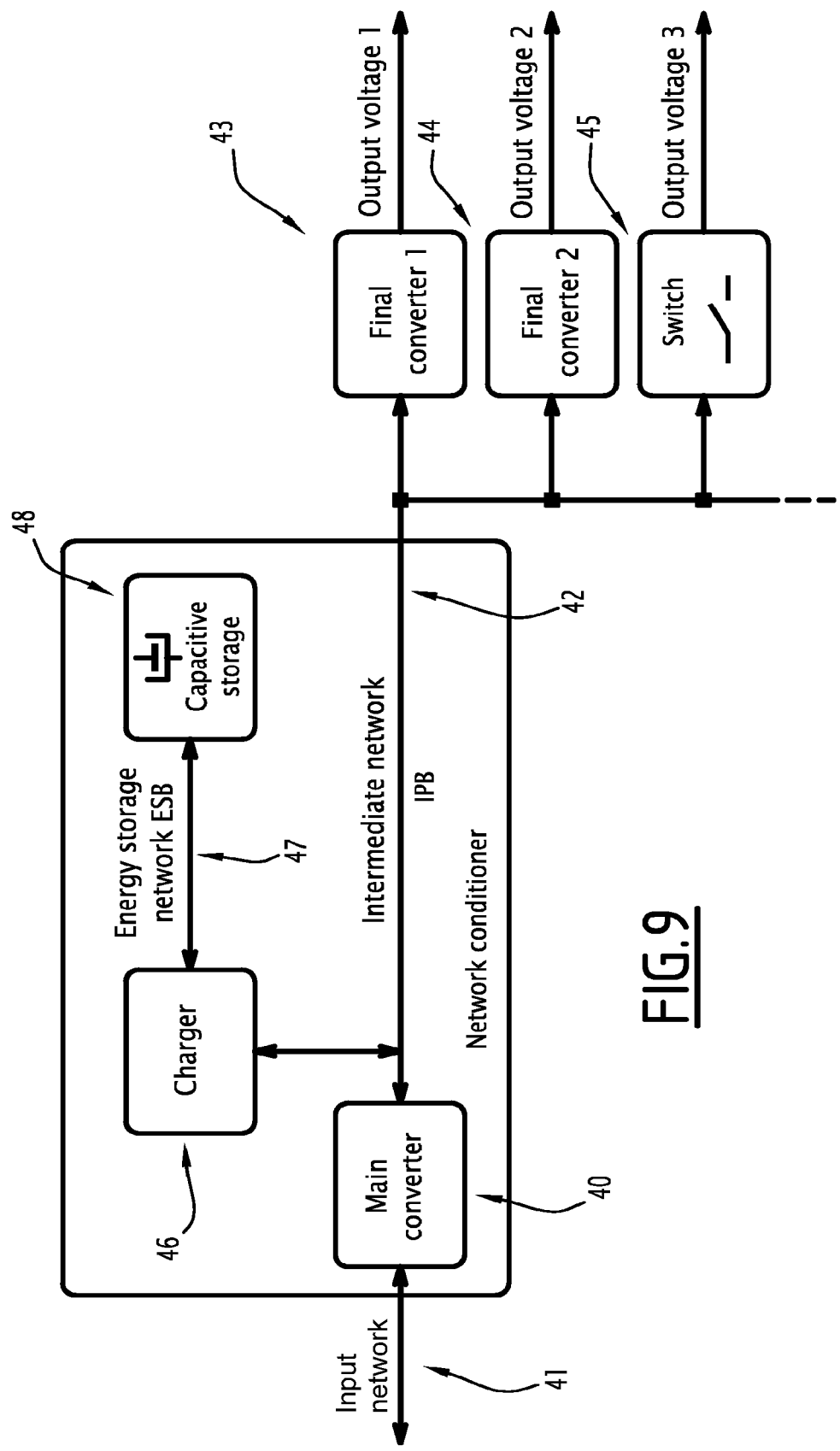
Figure 15:
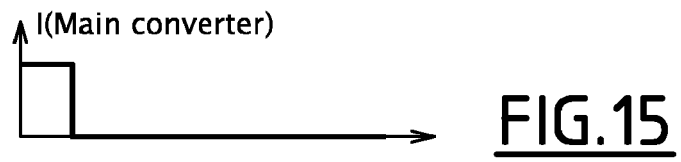
Figure 16:
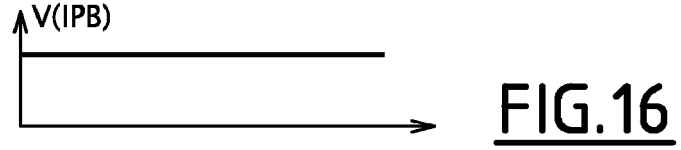
Figure 17:
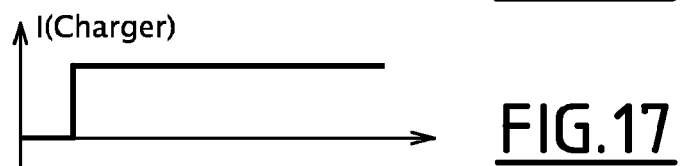
Figure 18:
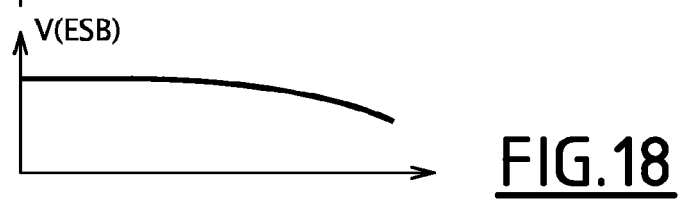
Figure 19:
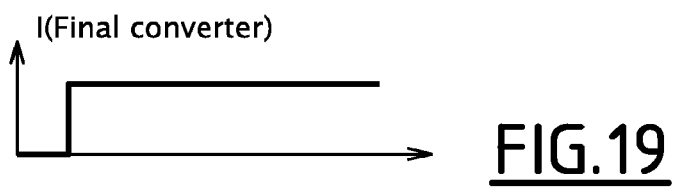
Figure 20:
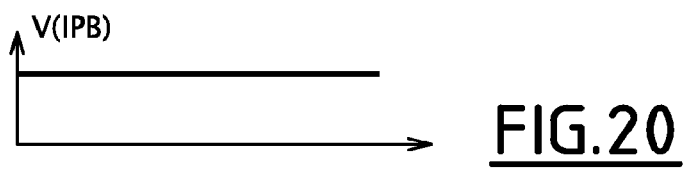
Figure 21:
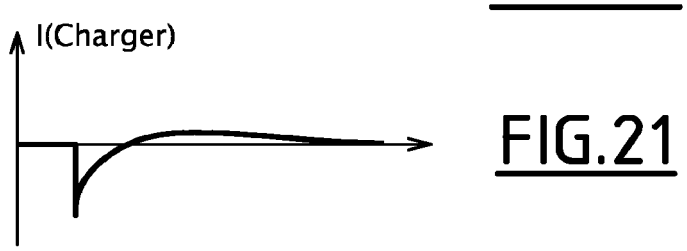
Figure 22:
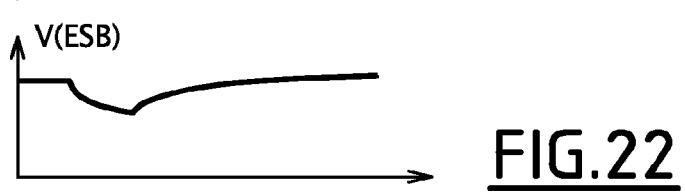
Figure 23:
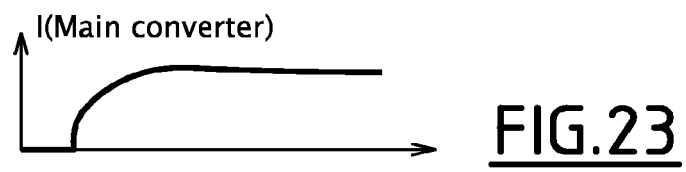
Figure 24:
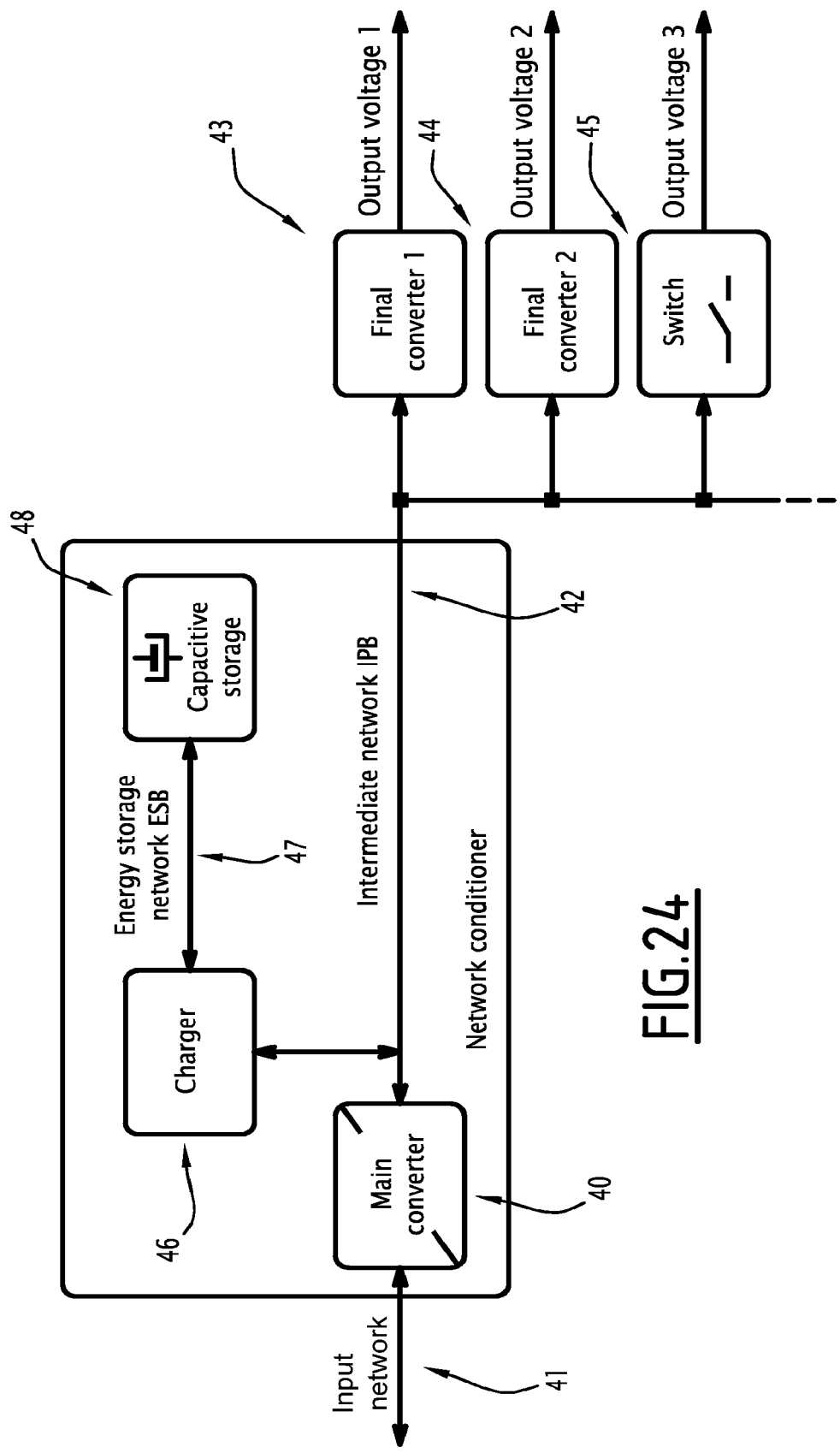
Figure 25:
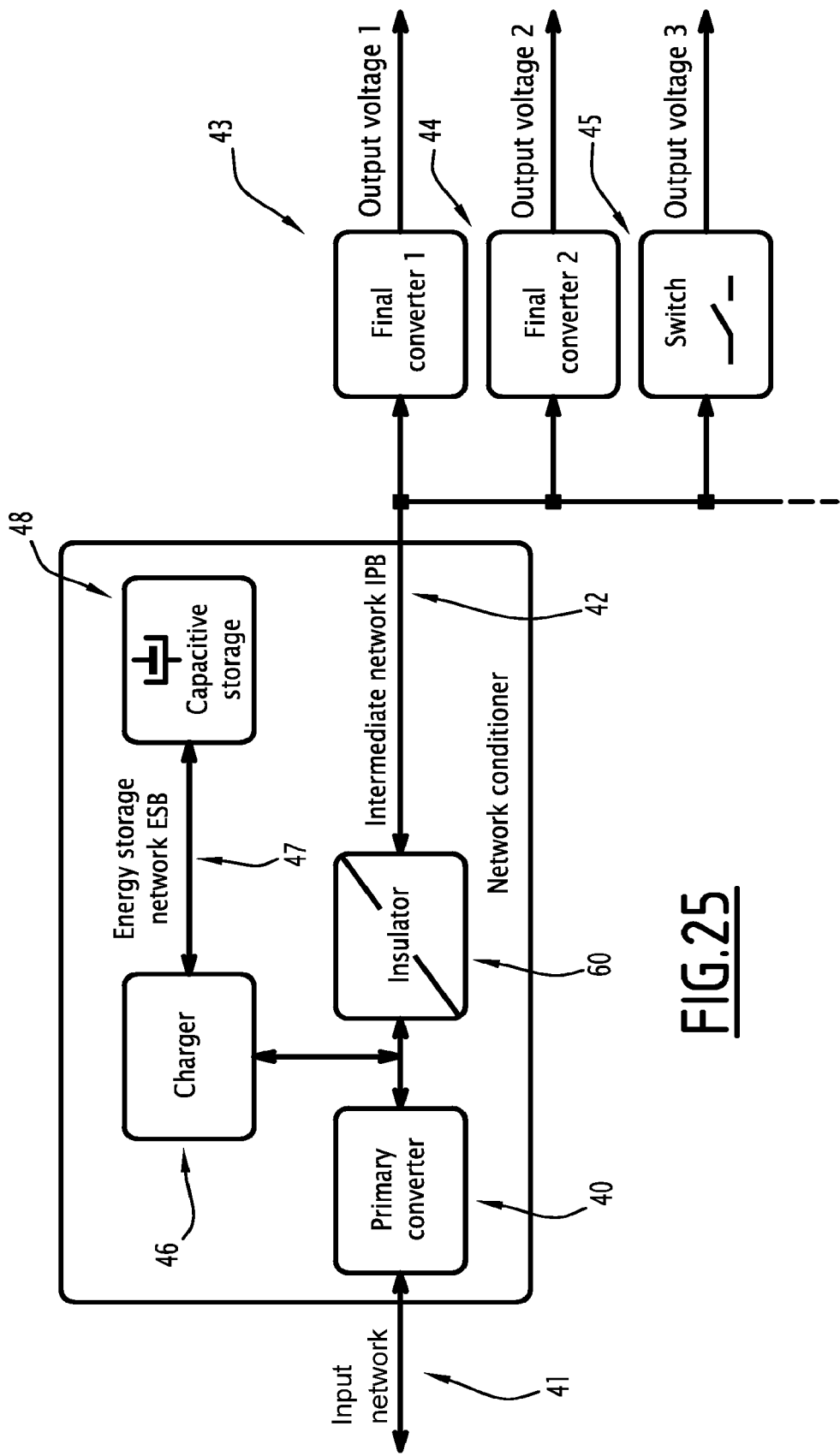
Figure 26:
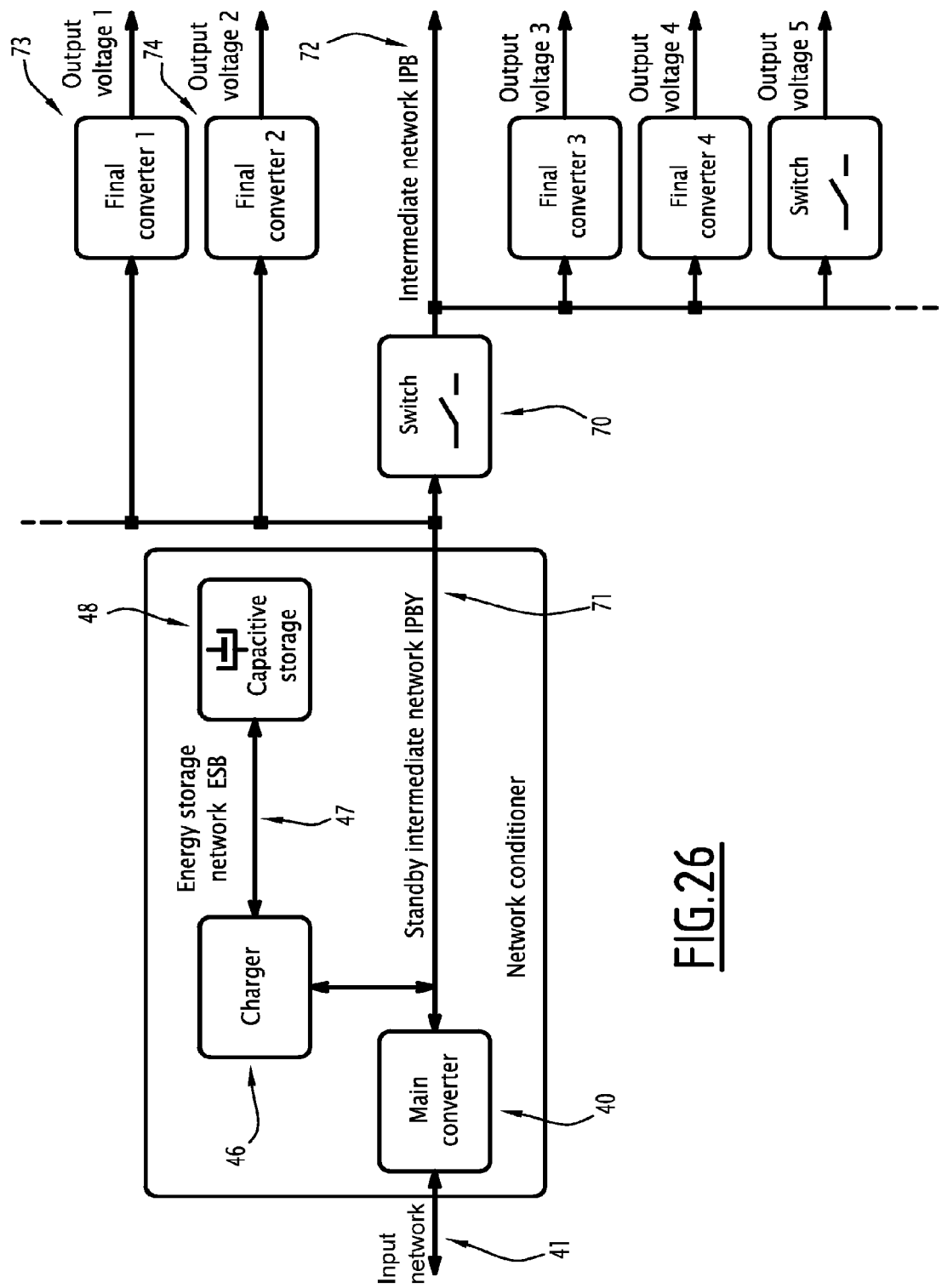

The invention will be better understood by means of the description which follows, only given as an example and made with reference to the appended drawings, wherein:

FIG. 1 illustrates a block diagram illustrating the structure of a first exemplary embodiment of a conversion system from the state of the art, FIGS. 2 and 3 illustrate the transparence of such a system to transient power line disturbances of the primary power network, FIGS. 4 and 5 illustrate the low pass filtering function of such a system, FIG. 6 illustrates a block diagram illustrating another structure of a conversion system of the state of the art, FIG. 7 further illustrates another embodiment of a conversion system of the state of the art, FIG. 8 illustrates a block diagram of still another embodiment of the conversion system of the state of the art, FIG. 9 illustrates a block diagram illustrating a conversion system according to the invention, FIG. 10 illustrates in a more detailed way this conversion system according to the invention, FIGS. 11 to 14 illustrate the charging of the energy reserve of such a system, FIGS. 15 to 18 illustrate the discharge of this reserve of energy, FIGS. 19 to 23 illustrate the operation of such a converter in the case of current requests, and FIGS. 24, 25 and 26 illustrate different alternative embodiments of a conversion system according to the invention.

Indeed, a first exemplary embodiment of an energy conversion system of the state of the art is illustrated in FIG. 1.

The latter conventionally includes a primary converter designated by the general reference 1, connected at the input to a primary power supply or input network designated by the general reference 2 and at the output to an intermediate or output network designated by the general reference 3, itself connected to final converters 4 and 5 respectively.

The latter then deliver the corresponding output voltages.

The primary converter 1 is, as for it, associated with energy storage means designated by the general reference 6.

With such a structure it is possible to obtain, as this is illustrated in FIGS. 2 and 3, transparence to transient power line disturbances of the primary power network. The energy allowing this characteristic is stored in the capacitive device for storing electric energy 6.

Also and as this is illustrated in FIGS. 4 and 5, with such a structure it is possible to obtain low pass filtering, i.e. an averaging of the current requests generated by the final converters 4 and 5, by means of the same capacitive energy storage device.

As this was indicated earlier, this prevents pollution of the primary power network by current requests of too high frequency.

In FIG. 6, another exemplary embodiment of a conversion system of the state of the art is illustrated.

The latter always includes a primary converter 10, the input of which is connected to an input network 11 and the output of which is connected to an output network designated by the general reference 12.

Final converters 13 and 14 respectively, are connected to this output network and deliver corresponding output voltages.

A capacitive energy storage device is directly placed on the output network 12, this storage device being designated by the general reference 15.

The output network voltage is slaved by control means designated by the general reference 16, on a reference voltage by control of the primary converter 10.

As this was indicated earlier, such a structure also has a certain number of drawbacks, in particular relating to the use of the capacitive energy storage device at its energy density optimum, the output network voltage which cannot be too low in order to obtain good energy density of the capacitive energy storage device and finally because the primary converter should have a constant power output characteristic over the whole of its output voltage range in order to be able to recharge the reserve of energy while providing the useful power at the end of the power line disturbance.

In FIG. 7, a block diagram of another embodiment of the conversion system of the state of the art is illustrated, such as for example the one described in document FR 2 895 167 mentioned earlier.

The latter still includes a primary converter, designated by the general reference 20, the input of which is connected to an input network, designated by the general reference 21 and the output of which is connected to an output network 22.

Final converters 23 and 24 respectively are connected to this output network 22 and deliver corresponding outputs.

First means for storing electrical energy designated by the general reference 25 are connected to this output network 22.

This output network 22 is also connected to a bidirectional charger designated by the general reference 26, associated with second electrical energy storage means designated by the reference 27.

Control means interposed between the output network 22 and the primary converter 20 and the charger 26 and the energy storage network allow the whole to be regulated and controlled.

These control means are designated by the general references 28 and 29 respectively.

As this was indicated earlier, this solution is neither optimum since it adds a converter to an already complex assembly and leaves untouched the problem of the input dynamic range of the final converters.

Another solution proposed in the state of the art and illustrated in FIG. 8 consists of placing the reserve of energy on an intermediate stage and of controlling the output network by means of a unidirectional or bidirectional converter also called a regulator.

It is in this way that a primary converter designated by the general reference 30 connected at the input to an input network 31 and the output of which is associated with an energy storage network 32, connected to electrical energy storage means 33, is recognized in this FIG. 8.

The converter 30 is associated with means, designated by the general reference 34, for regulating the voltage of this energy storage network on a reference voltage.

This energy storage network is also coupled with a regulator 35, the output of which is connected to an output network, designated by the general reference 36, connected to final converters 37 and 38 respectively, delivering corresponding outputs.

Control means designated by the general reference 39 allow control of the regulator 35 for regulating the voltage of the output network on another reference voltage.

However, this solution also has a certain number of drawbacks as indicated earlier.

An exemplary embodiment of an electrical energy conversion system according to the invention is illustrated in FIGS. 9 and 10.

Identical reference numbers designate identical members illustrated on both of these figures.

It is in this way that a conversion system is recognized in these FIGS. 9 and 10, which includes a main converter designated by the general reference 40, the input of which is associated with an input network 41 operating under an input voltage.

The output of this main converter 40 is associated with a power output network also called an IPB (Intermediate Power Bus) network, this network being designated by the general reference 42 and operating on an output voltage.

This network is connected to final converters 43 and 44 for example, delivering corresponding outputs or further to a switch such as for example the one designated by the general reference 45.

The output network IPB 42 is also associated with a bidirectional charger designated by the general reference 46, itself connected to an electric energy storage network designated by the general reference 47, connected to a capacitive electric energy storage device 48 and operating on a storage voltage.

Different controls are applied as this is illustrated more clearly in FIG. 10.

Thus, the charger 46 is associated with means for slaving on the voltage of the IPB output network, these means being designated by the general reference 49.

With this, it is then possible to slave the output voltage of the latter, i.e. the voltage of the output network on a first set vale for example $V_{ref2}$.

Another control loop relates to the main converter 40 which itself is slaved on the voltage of the energy storage network 47 via corresponding means designated by the general reference 50.

The main converter 40 is then driven by control means for slaving the storage voltage on a second set value such as for example designated by $V_{ref1}$.

It is then conceivable that the general structure of such a conversion system includes an output network called an IPB regulated on a constant DC voltage. On this network are connected the final converters transforming the voltage of this network into outputs distributed to electronic means in a standard way.

The voltage of the energy storage network is variable according to the operating phases. On this network are connected the capacitive energy storage components.

The system according to the invention also includes a main converter transferring the energy from the input network to the output network and a bidirectional charger transferring the energy from the output network to the energy storage network for the phases for charging the reserve of energy and in the opposite direction for the phases for discharging the latter.

This charger may for example be formed by a converter of the down-converter type also known as a reversible "buck" converter and with synchronous rectifying, controlled in a peak current mode with limitation of positive and negative current and at a set frequency, for example.

The operation of such a configuration may be illustrated by studying the different operating phases of the latter.

Thus for example in FIGS. 11, 12, 13 and 14, the operating phase is illustrated, corresponding to the charging of the energy reserve.

This phase corresponds for example to the starting or to the return of the network after a transient power line disturbance.

The voltage V(ESB) i.e. that of the energy storage network being less than the corresponding set value, i.e. $V_{ref1}$, the error corrector 50 orders the main converter 40 to transfer energy towards the IPB output network 42.

As an excess of energy is transferred to this output network, its voltage will tend to increase. This increase is detected by the corrector 49 which orders the charger to transfer energy from the output network 42 to the energy storage network 47 (FIGS. 13 and 14).

In this way there is a transfer of energy from the input network 41 to the energy storage network 47 through the converter 40 and the charger 46.

FIGS. 15, 16, 17 and 18 as for them correspond to the discharge of the energy reserve.

This discharge for example corresponds to a transient power line disturbance of the input network 41.

In this case, as the main converter 40 no longer provides energy to the output network 42, the voltage of the latter tends to decrease.

This decrease is detected by the corrector 49, which orders the charger 46 to transfer energy from the energy storage network 47 to the output network 42.

The voltage of the energy storage network 47 then naturally decreases depending on the current provided to the output network 42, on the yield of the charger 46 and on the energy storage capacity of the capacitive component 48 connected to the latter.

In the case of a current request as this is illustrated in FIGS. 19, 20, 21, 22 and 23, for example when one of the final converters performs a sudden current request or a periodic current request of high frequency on the output network 42, the current request on this network causes decreasing of the voltage of the latter.

This decrease is detected by the corrector 49 which orders the charger 46 to transfer energy from the energy storage network 47 to the output network 42.

Because of this transfer of energy, the voltage of the energy storage network 47 decreases.

This decrease is detected by the error corrector 50, which orders the main converter 40 to transfer energy from the input network 41 to the output network 42. The output network voltage 42 then tends to increase, a tendency which is detected by the corrector 49 which orders the charger 46 to transfer energy from the input network 42 to the energy storage network 47, thereby recharging the energy reserve 48.

It is conceivable that the loop integrating the regulator controls the power provided by the charger 46 from the voltage of the output network 42 and ensures a high frequence response under a current request.

These current requests are then filtered and averaged by the impedance of the capacitive energy storage 48.

The loop integrating the regulator 50 as for it controls the power provided by the main converter 40 from the voltage of the energy storage network 47 and thereby ensures the response to the averaged current of the final converters.

The loop integrating the regulator 50 may voluntarily be adjusted to be slow, in order to amplify the filtering phenomenon. This filtering may also be decreased in frequency by increasing the value of the capacitance of the energy storage device 48.

Generally, the slaving rate of the control means of the charger is greater than that of the control means of the main converter.

The regulator 50 may for example be a simple low frequency proportional regulator, which allows more easy control of the loop in the cases when the value of the capacitance of the energy storage device 48 is adjustable.

Complementary elements may be contemplated such as for example galvanic insulation means.

This is for example illustrated in FIG. 24 in which are recognized the main converter 40, the input network 41, the output network 42, the charger 46, the energy storage network 47, the capacitive storage means 48 and the output members such as the converters 43 and 44 and the switch 45.

A galvanic insulation means may then be integrated into the main converter 40, the output network 42, the charger 46, the energy storage network 47, the capacitive storage means 48 and the output members 43 to 45 then being galvanically insulated from the input network 41.

However, and as this is illustrated in FIG. 25, in which identical reference numbers designate identical or similar elements to those already described, an insulator designated by reference 60, may also be integrated at the output of the main converter 40. This insulator then delivers at the output the output network 42.

The input network 41, the main converter 40, the energy reserve 48, its network 47 and its charger 46 are then galvanically insulated from the output network 42 and from the output members 43 to 45.

Of course, an extension of this architecture may for example include two energy reserves, one at the primary and the other one at the secondary of such a galvanic insulation system.

Also, and as this is illustrated in FIG. 26, the output network may be cut into two by using a switch designated by the general reference 70. In this case, the output network appears as two output portions, 71 and 72 respectively.

One of these portions such as for example the portion 71 may for example be reserved for certain final converters such as the converters 73 and 74 while the other output network portions 72 is, as for it, reserved for other converters.

In particular, the converters 73 and 74 may be active converters in a standby mode.

This standby mode generally requires a very low output power and the charger 46 may then implement a low consumption mode by modifying its operating mode and by allowing its performances to be adapted to the constraints of such an operating mode.

Thus for example in the type of contemplated applications, the charger 46 may have a low power mode giving the possibility of:
 decreasing the switching frequency and thereby decreasing the control losses of the switches and the switching losses,
 disabling the synchronous rectifying making the converter unidirectional and authorizing discontinuous conduction in order to decrease the losses in the inductor and the losses associated with the switch which is no longer controlled,
 having an <<on the fly>> transition from the full power mode to the reduced power mode and vice versa, without any impact on the voltage of the output network,
 having an <<on the fly>> adaptation of the error corrector 49 slaving the charger on the voltage of the output network, and
 controlling this new control mode in a voltage mode, with generation of a ramp proportional to the voltage of the energy storage network, the set value from the corresponding corrector 42 having then been freed from its dependence on the voltage of the energy storage network.

It is then conceivable that such an energy conversion system has a certain number of advantages.

In the case of a disconnection of the input network, there is no mode switching and the output network has the same characteristics than in normal operation.

During current requests on the output network, they are first of all transmitted by the charger to the capacitive storage means which filters them out by their current/voltage characteristics (impedance of electrolytic capacitors) before being reflected by the main converter to the input network.

Failures become detectable in normal operation, all the converters are operating and there is no switched system. A failure of a function is then expressed by an erroneous output voltage on a network. The failures may then be detected by conventional diagnostic functions.

The regulation of the output network is optimum therein, regardless of the operating phases, including during the phase transitions.

The output network has a set and constant voltage in all the operating phases, which simplifies the design of the final converters. This design of the final converters is also optimized in terms of yield.

The thereby proposed blockwise cutting out also has consequent advantages:
 the voltage of the energy storage network is easily adjustable according to the needs since it is sufficient to modify the feedback loop integrating the regulator 50 and the power elements of the charger. There is no impact on the input converter or on the final converters,
 the architecture may easily be adapted for handling galvanic insulation. Either the energy reserve is placed at the secondary of such an insulation and this insulation is achieved in the main converter, or the energy reserve is placed at the primary and the insulation is achieved by a bidirectional insulating converter placed before the final converters.

This design may also be transposed for an AC or DC network input only by modifying the main converter, without having any impact on the remainder of the converters.

The invention claimed is:

1. An electric energy conversion system of the type including a main converter connected at the input to at least one input network operating under an input voltage and at the output to an output network operating under an output voltage and associated with a device for storing electric energy, operating under a storage voltage, the system comprising:
 a capacitive electrical energy storage;
 a first control component;
 a second control component;
 a bidirectional charger connected to the output network on one side and to the capacitive electrical energy storage on the other side, the operation of the bidirectional charger being driven by the second control component for providing a closed-loop control of the output voltage on a first set value ($V_{ref2}$), wherein the operation of the main converter is driven by the first control component for providing a closed-loop control of the storage voltage on a second set value ($V_{ref1}$).

2. The electrical energy conversion system according to claim 1, wherein the bidirectional charger includes a synchronous rectifier controlled in a peak current mode and with positive and negative current limitation and operating at a set frequency.

3. The electric energy conversion system according to claim 2, wherein the first control component for controlling the main converter includes a proportional regulator.

4. The electric energy conversion system according to any of the preceding claims, wherein the closed-loop control rate of the second control component for controlling the bidirectional charger is greater than that of the first control component for controlling the main converter.

5. The electric energy conversion system according to claim 1, further comprising a galvanic insulation component between the input network and the output network.

6. The electric energy conversion system according to claim 5, wherein the galvanic insulation component is integrated into the main converter.

7. The electric energy conversion system according to claim 5, wherein the output network comprises an insulator and the insulator includes the galvanic insulation component.

8. The electric energy conversion system according to claim 1, wherein the output network includes two portions separated by a switch and to which are connected distinct loads.

9. The electric energy conversion system according claim 1, wherein the input network is a DC network.

10. The electric energy conversion system according to claim 1, wherein the input network is an AC network.

* * * * *